(12) United States Patent
Acquaye

(10) Patent No.: US 11,911,856 B1
(45) Date of Patent: *Feb. 27, 2024

(54) MOBILE HARDBANDING UNIT

(71) Applicant: James G. Acquaye, Oklahoma City, OK (US)

(72) Inventor: James G. Acquaye, Oklahoma City, OK (US)

( * ) Notice: Subject to any disclaimer, the term of this patent is extended or adjusted under 35 U.S.C. 154(b) by 1010 days.

This patent is subject to a terminal disclaimer.

(21) Appl. No.: 16/391,549

(22) Filed: Apr. 23, 2019

Related U.S. Application Data

(63) Continuation of application No. 15/041,700, filed on Feb. 11, 2016, now Pat. No. 10,307,852.

(51) Int. Cl.
| | | |
|---|---|---|
| *B23K 9/04* | (2006.01) | |
| *B23K 9/23* | (2006.01) | |
| *B23K 9/00* | (2006.01) | |
| *B23K 10/02* | (2006.01) | |

(52) U.S. Cl.
CPC ............ *B23K 9/046* (2013.01); *B23K 9/0052* (2013.01); *B23K 9/23* (2013.01); *B23K 10/027* (2013.01)

(58) Field of Classification Search
CPC .... B23K 10/027; B23K 9/0052; B23K 9/046; B23K 9/23
See application file for complete search history.

(56) References Cited

U.S. PATENT DOCUMENTS

| | | |
|---|---|---|
| 3,947,269 A | 3/1976 | Prasse et al. |
| 4,048,465 A | 9/1977 | Manz |
| 4,104,505 A | 8/1978 | Rayment et al. |
| 4,147,917 A | 4/1979 | Jelmorini |
| 4,233,489 A | 11/1980 | Essers |
| 4,243,727 A | 1/1981 | Wisler et al. |
| 4,321,454 A | 3/1982 | Willems et al. |
| 4,376,793 A | 3/1983 | Jackson |
| 4,390,368 A | 6/1983 | Houck |
| 4,395,279 A | 7/1983 | Houck |
| 4,431,902 A | 2/1984 | Wallen |
| 4,731,253 A | 3/1988 | DuBois |
| 4,872,904 A | 10/1989 | Dorfman |
| 4,923,511 A | 5/1990 | Krizan et al. |
| 5,258,599 A | 11/1993 | Moerke |
| 5,296,667 A | 3/1994 | Marantz et al. |
| 5,328,763 A | 7/1994 | Terry |

(Continued)

FOREIGN PATENT DOCUMENTS

WO 2012012754 A1 1/2012

OTHER PUBLICATIONS

Miller Electric Mfg. Co. "Trailblazer DC and AC/DC Gasoline or Diesel Engine Driven Welding Generators," brochure, Sep. 1979, (6 pages) Miller Electric Mfg., Co., Appleton, WI, USA.

*Primary Examiner* — Dana Ross
*Assistant Examiner* — Joe E Mills, Jr.
(74) *Attorney, Agent, or Firm* — Mary M. Lee

(57) ABSTRACT

A mobile hardbanding system that uses PTA welding to perform hardbanding on drill string sections at the well site. The inventive system allows alternate use of PTA and MIG welding. Both a PTA torch and a MIG torch are provided. Changing from one type of welding to the other is simplified by including separate electrical, gas, and cooling conduits for each torch. The torch not in use is parked in the welding compartment near the weld box. The powder hopper for the PTA welding assembly may be mounted on a swivel arm so that it can be moved out of the way when the MIG torch is in use.

10 Claims, 15 Drawing Sheets

(56) References Cited

U.S. PATENT DOCUMENTS

| | | |
|---|---|---|
| 5,719,369 A | 2/1998 | White et al. |
| 6,265,687 B1 | 7/2001 | Gourlaouen et al. |
| 6,497,922 B2 | 12/2002 | Knight et al. |
| 6,593,540 B1 | 7/2003 | Baker et al. |
| 6,693,252 B2 | 2/2004 | Zhang et al. |
| 6,774,338 B2 | 8/2004 | Baker et al. |
| 6,844,521 B2 | 1/2005 | Staufer et al. |
| 7,020,539 B1 | 3/2006 | Kovacevic et al. |
| 7,115,832 B1 | 10/2006 | Blankenship et al. |
| 7,180,028 B2 | 2/2007 | Flood et al. |
| 7,235,758 B2 | 6/2007 | Ignatchenko et al. |
| 8,067,711 B2 | 11/2011 | Blankenship et al. |
| 8,322,466 B2 | 12/2012 | Bird |
| 8,350,182 B2 | 1/2013 | Shipulski et al. |
| 8,393,518 B2 | 3/2013 | Corcoran |
| 8,460,604 B2 | 6/2013 | Junod et al. |
| 8,471,182 B2 | 6/2013 | Stauffer et al. |
| 8,507,826 B2 | 8/2013 | Blankenship et al. |
| 8,692,150 B2 | 4/2014 | Strock et al. |
| 8,866,036 B2 | 10/2014 | Wada et al. |
| 8,952,292 B2 | 2/2015 | Behmlander et al. |
| 8,969,754 B2 | 3/2015 | Luce et al. |
| 2003/0010756 A1 | 1/2003 | Enyedy |
| 2004/0159644 A1 | 8/2004 | Zhang et al. |
| 2005/0279742 A1 | 12/2005 | Stava |
| 2006/0185473 A1 | 8/2006 | Withers et al. |
| 2008/0149602 A1 | 6/2008 | Lenzner et al. |
| 2012/0118866 A1 | 5/2012 | Tanaka et al. |
| 2012/0261390 A1 | 10/2012 | Boulos et al. |
| 2012/0298628 A1 | 11/2012 | Bowers |
| 2013/0026141 A1 | 1/2013 | Liebold et al. |
| 2013/0092453 A1 | 4/2013 | Johnson |
| 2013/0140280 A1 | 6/2013 | Biskup et al. |
| 2015/0053429 A1 | 2/2015 | Schultz et al. |
| 2015/0158129 A1 | 6/2015 | Matthews et al. |
| 2016/0074973 A1 | 3/2016 | Kachline et al. |
| 2016/0355902 A1 | 12/2016 | Yang et al. |

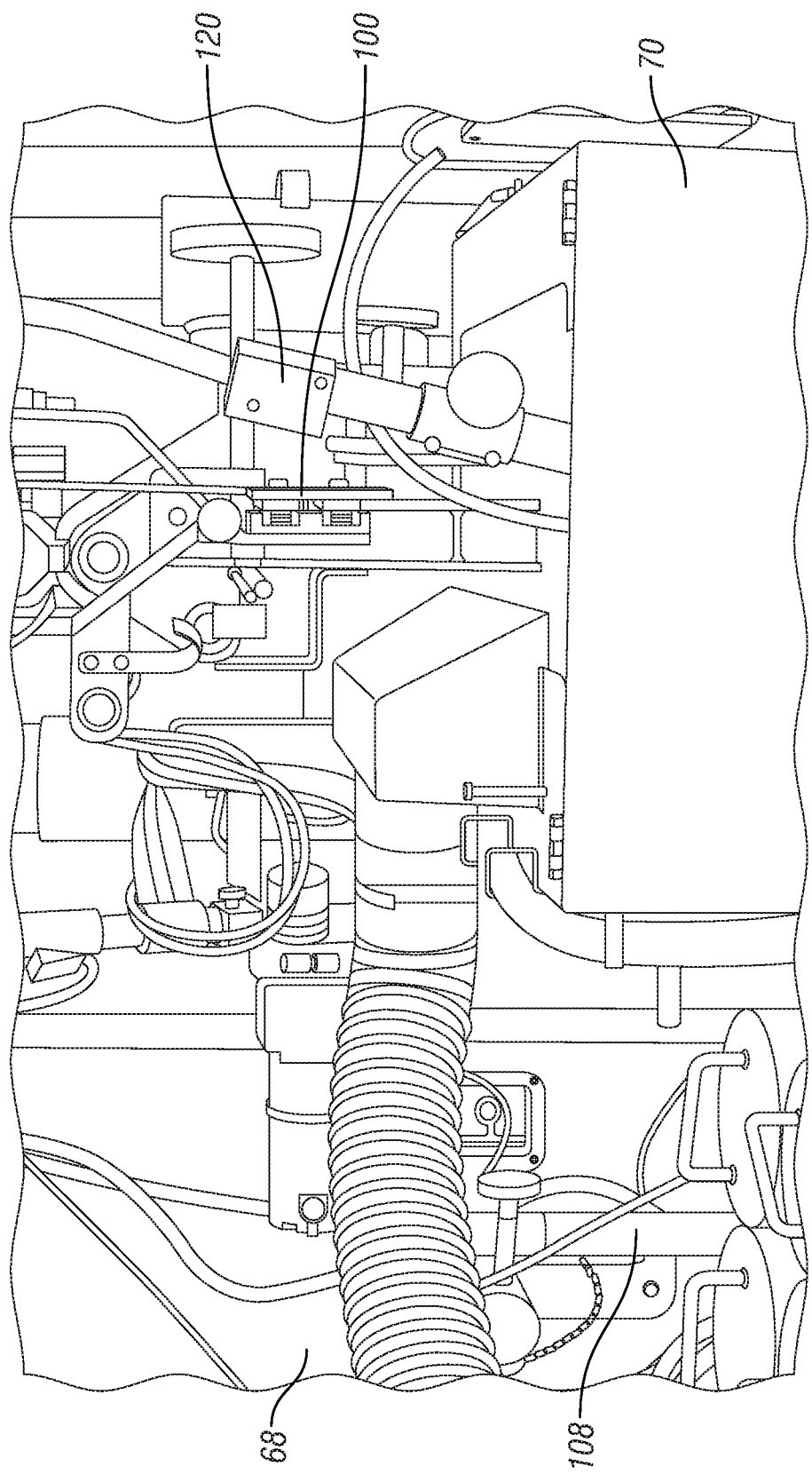

MOBILE HARDBANDING UNIT

CROSS-REFERENCE TO RELATED APPLICATIONS

This application is continuation of co-pending application Ser. No. 15/041,700, entitled "Mobile Hardbanding Unit," filed Feb. 11, 2016, and the content of this prior application is incorporated herein by reference.

FIELD OF THE INVENTION

The present invention relates generally to hardbanding drill string sections, such as drill collars and drill pipes.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate a preferred embodiment of the invention and are not to be construed as limiting the scope of the invention.

FIG. 14 is a view from the rear of the unit showing the MIG torch working and the PTA torch parked on the front of the storage cabinet beside the weld box.

DETAILED DESCRIPTION OF THE PREFERRED EMBODIMENT(S)

Figure 1:
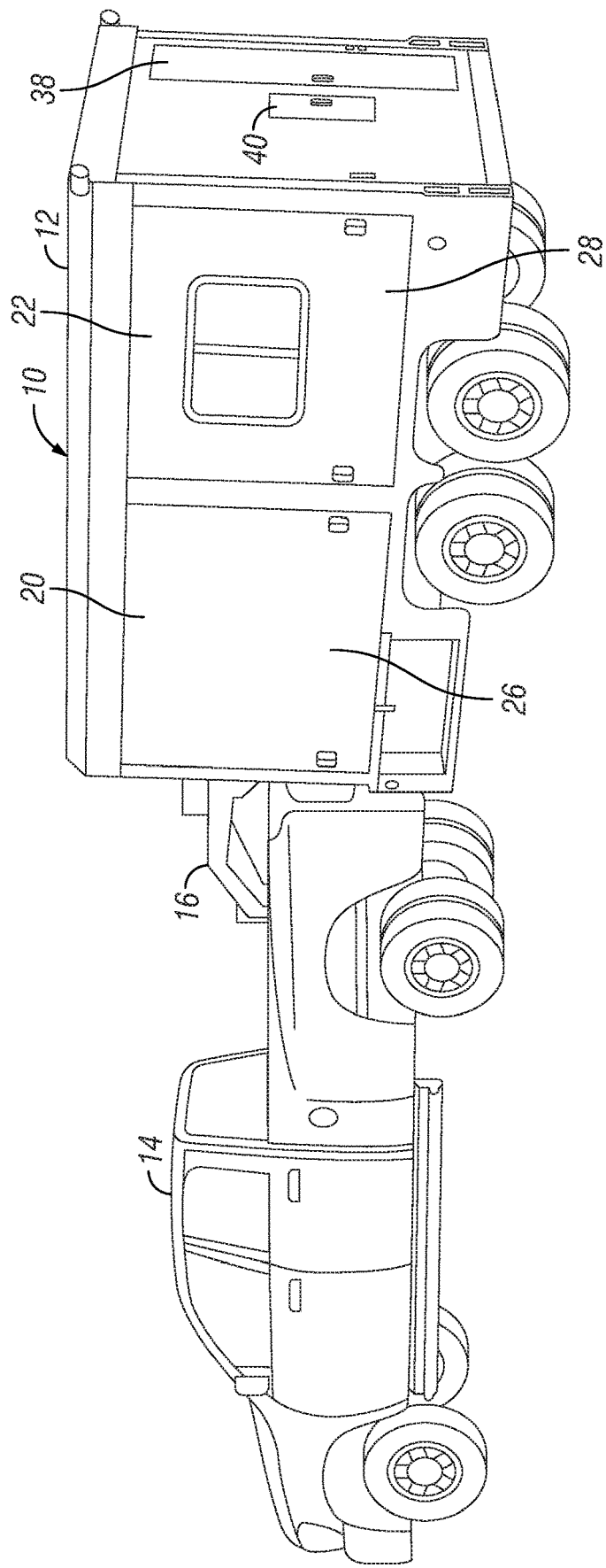
FIG. 1 is a left side perspective view of a mobile hardbanding unit made in accordance with a preferred embodiment of the invention. The unit comprises an enclosed trailer with gooseneck hitch being pulled by a pickup truck.

In oil and gas well drilling, rotational drill strings are commonly used to drill a wellbore that may reach as far as several miles in length. The drill string is composed of multiple interconnecting tubular steel sections with a drill bit and often other tools on the end. The interconnecting sections, referred to herein generally as "drill string sections," include drill pipe and drill collars. Drill pipes, both standard and heavy weight, make up most of the drill string and typically are 18 to 45 feet long and may weigh as much as 14,000 pounds. Welded to each end of the drill pipe sections are threaded tool joints, the means by which the drill pipe sections are connected together to form the drill string.

Drill collars are shorter but much heavier tubular members usually placed near the end of the drill string to add weight above the bit. Drill collars also have threaded ends, but they are machined directly into the elongated tubular pipe.

The process of advancing the drill string through the well bore subjects the tubular sections, and particularly the drill pipe sections, to substantial stress and frictional forces. As a general rule, the threaded tool joints are the part of the drill string that is most susceptible to failure, and the useful lifetime of pipe and collar sections is, therefore, directly dependent on the durability and structural integrity of the tool joints.

In an effort to extend the useful life of these drill string sections, it is common to apply a band of hardened metal to the outer surface of the pipe in close proximity to the tool joints. Such hard metal bands are applied to the sections by conventional welding processes. The use of hardbands has proven to be extremely effective both in retarding the rate of frictional wear at the tool joints and in significantly improving the tool joint's structural strength.

In the so-called "raised face" hardbanding technique, the hardbands are welded directly onto the surface of the sections creating a larger overall diameter than the outer diameter of the drill section itself. Frictional forces are thus focused at the thicker hardbanded regions during drilling operations so that the hardbands absorb most of the wear. Thus, hardbanding makes it possible to extend the lifetime of drill pipes or collars almost indefinitely by periodically replacing the hardbands.

Initially, hardbanding was applied to drill string sections at permanent welding facilities. The cost to transport the pipe sections to and from the facility was high. In addition, the well operator was required to maintain a large inventory of hardbanded pipe sections so that the periodic maintenance or replacement of worn sections would not necessitate a lengthy and expensive shutdown.

Mobile hardbanding units have taken the hardbanding process to the well site. These mobile units have eliminated the costs and delays associated with transporting the pipe sections to a permanent facility and have greatly reduced the strain on the operator's pipe inventory caused by the down time of the sections being treated.

A variety of welding methods have been used to apply hardbanding to drill string sections. These welding techniques include TIG (tungsten-inert-gas), MIG (metal-inertgas), GMAW (gas metal arc welding), GTAW (gas tungsten arc welding), PTA (plasma transferred arc), and FCAW (flux cored arc welding). In many applications, the PTA technique is preferred; it is easily automated, provides a precise application of the deposited material, and creates a band that is metallurgically fused to the pipe. Still further, a band created by PTA welding is harder and more abrasion resistant and yet provides a smoother, more "casing-friendly" surface.

To date, mobile hardbanding units have been limited to certain types of welding, such as MIG and TIG welding. One such unit is shown and described in U.S. Pat. No. 4,431,902, issued on Feb. 14, 1984, and entitled "Portable Hardbander," the contents of which are incorporated herein by reference.

The present invention provides a mobile hardbanding system that uses PTA welding. Moreover, in a preferred embodiment, the inventive system allows alternate use of PTA and MIG welding. Both a PTA torch and a MIG torch are provided, and switching between one and the other is simplified by including separate electrical, gas, and cooling conduits for each torch. In this way, connection and reconnection of the various conduits is unnecessary to convert from one process to the other.

Turning now to the drawings in general and to FIG. 1 in particular, there is shown a mobile hardbanding unit constructed in accordance with a preferred embodiment of the present invention and designated generally by the reference number 10. The unit 10 comprises a mobile platform, such as a trailer. Most preferably, to enable use of the unit 10 in inclement weather, the platform is a partially or fully enclosed trailer 12. The trailer 12 may be hitched to a truck or other towing vehicle 14 using a hitch, such as the gooseneck 16. Although an enclosed trailer as shown is preferred in most instances, the platform alternately may be supported on a skid.

Figure 2:
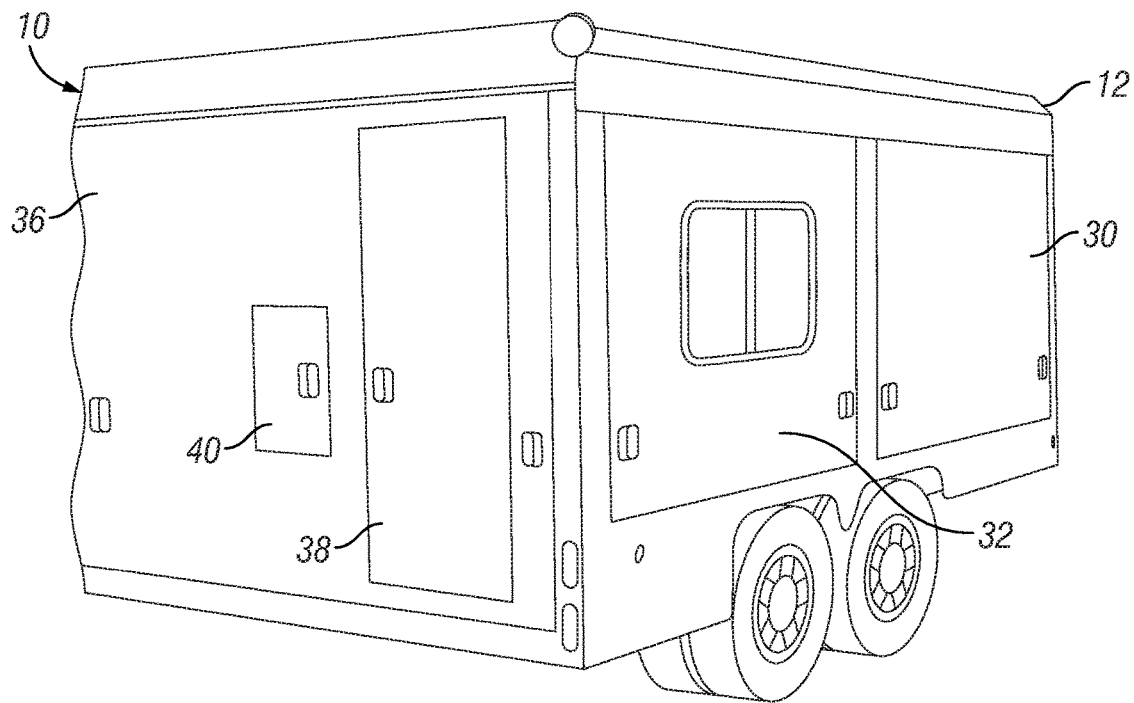
FIG. 2 is a right rear perspective view of the unit with the doors closed.

The trailer 12 in generally divided into a front section 20 and a back section 22. As will become apparent, the front section 20 is configured to house or carry some of the consumables and larger equipment. The rear section 22 comprises a welding compartment, where the welding operations are performed. As seen in FIGS. 1 and 2, the left side of the trailer 12 has two large doors 26 and 28, and similarly the right side of the trailer, seen in FIGS. 3 and 4, has two large doors 30 and 32. As used herein, "right" and "left" refers to the driver's perspective, that is, "left" refers to the driver's side of the trailer or unit, and "right" refers to the passenger side of the trailer or unit. The rear side doors 28 and 32 (FIGS. 1 & 2), which enclose the welding compartment, may be provided with windows, as this is the area where the operator spends most of the time monitoring the welding operations.

As seen in FIGS. 1 and 2, the back of the trailer 12 has a large full-wall door 36. A smaller access door 38 is provided for the operator to enter and exit the welding compartment without having to lift up the full-wall door 36. A small pipe door 40 is included for the drill string section that is being hardbanded. This allows the larger door 36 to remain closed, when necessary for the operator's comfort.

Figure 3:
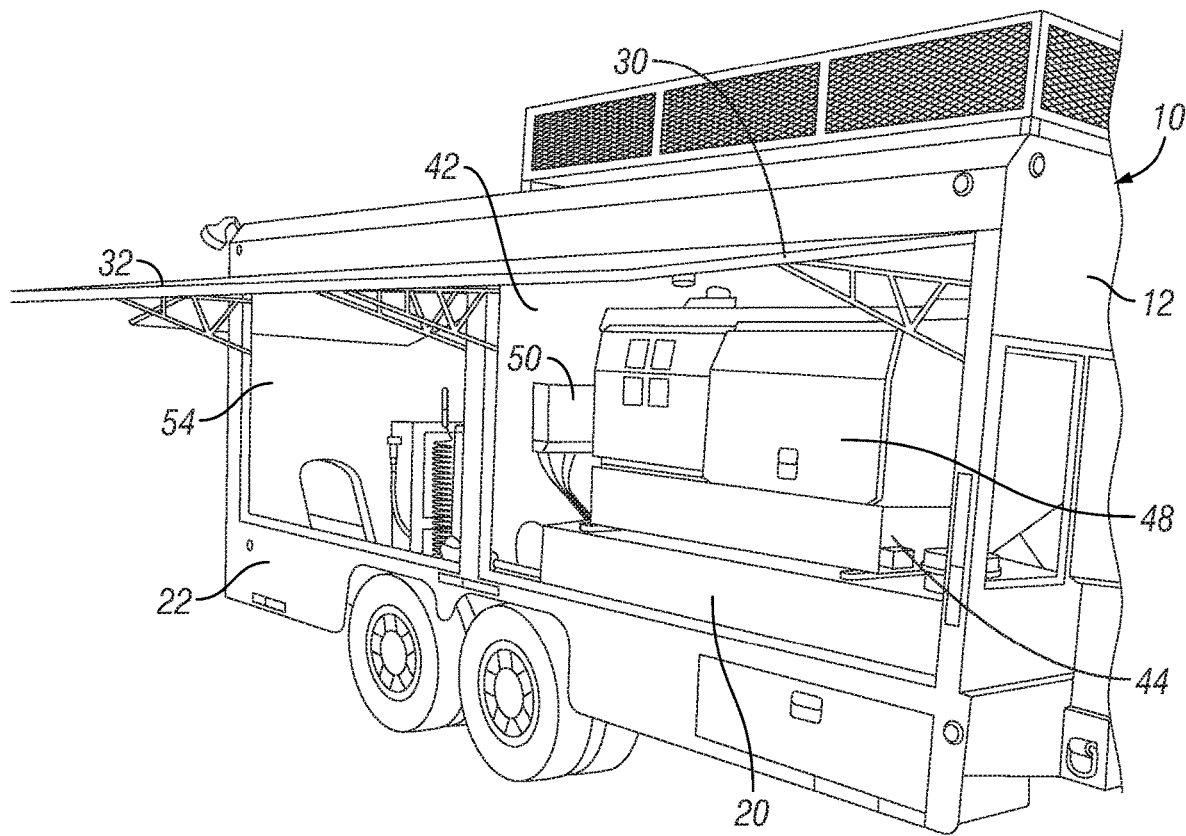
FIG. 3 is a right front perspective view of the unit with both side doors opened.
Figure 4:
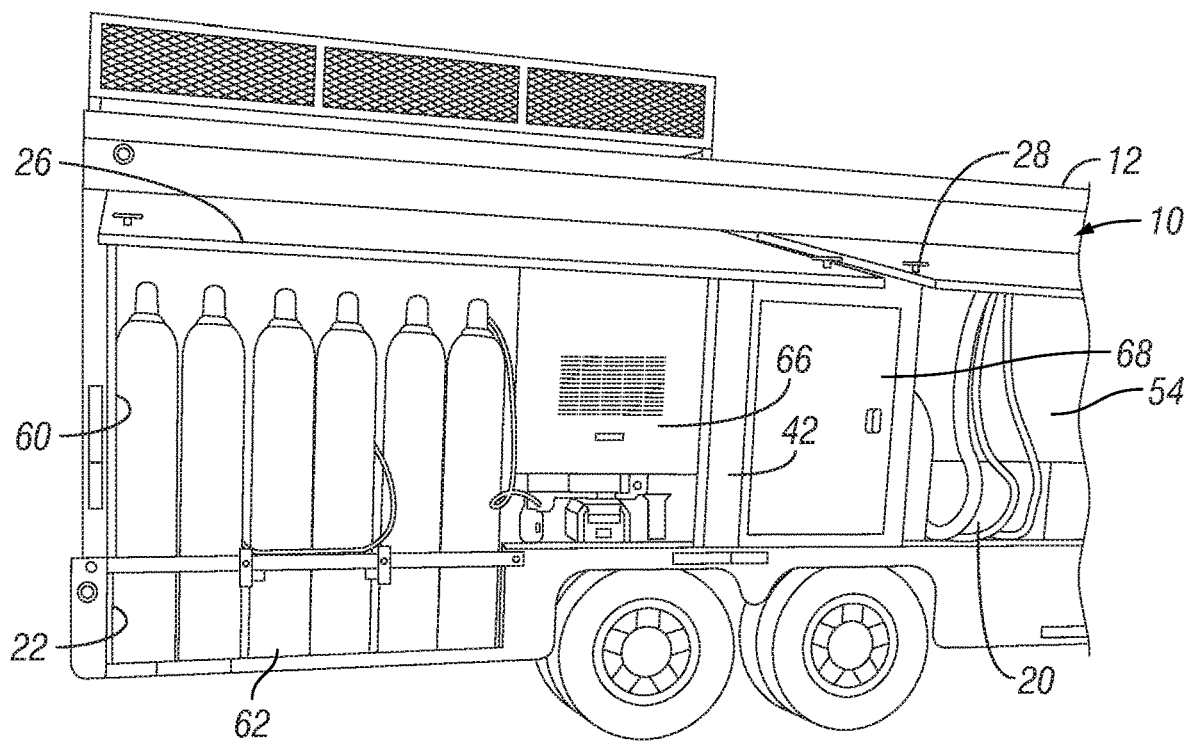
FIG. 4 is a left side view of the unit with both side doors opened.
Figure 5:
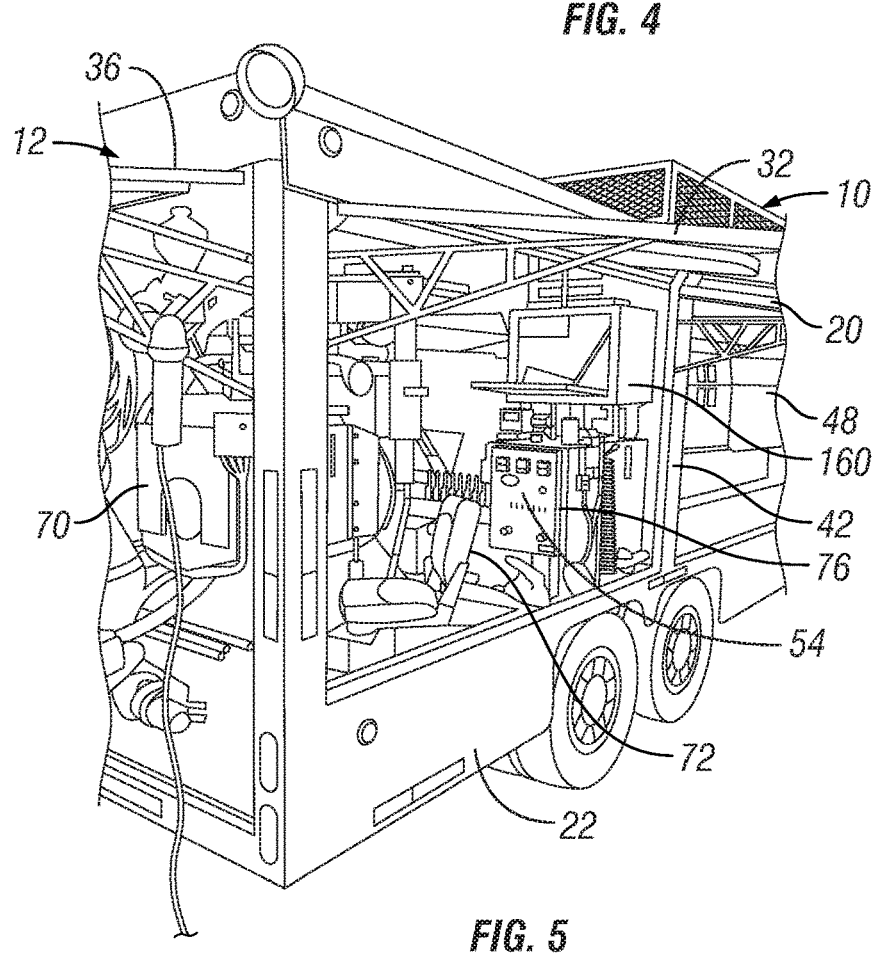
FIG. 5 is a right rear view of the unit with the rear door opened showing the welding compartment.

FIGS. 3-5 illustrate the unit 10 with the doors open. As best seen in FIG. 3, a partition 42 preferably is provided to separate the front and rear sections 20 and 22 of the trailer 12. The right front door 30 covers a right front compartment 44 that contains the main welder generator 48. The adjacent partition 42 is a convenient location for a PTA/MIG polarity switch 50, which will be explained in more detail below. The right rear door 32 encloses the side of the welding compartment 54.

Turning to FIG. 4, on the left side of the trailer 12, the left front door 26 encloses a large gas storage compartment 60 configured for carrying gas containers. In the unit shown, the compartment 60 carries six (6) tanks of welding gases (helium, argon, etc.), designated generally at 62. Additionally, there is room for a propane tank (not shown) behind the welding gas tanks 62, which is needed for warming the drill string sections prior to the hardbanding operation. As will be explained hereafter, the PTA welding torch requires a cooling system, and thus a chiller 66 is provided; it may be mounted adjacent the partition 42. On the opposite side of the partition 42, in the welding compartment 54, an enclosed storage cabinet 68 is mounted so that it opens to the side of the trailer 12 for easy access.

Figure 6:
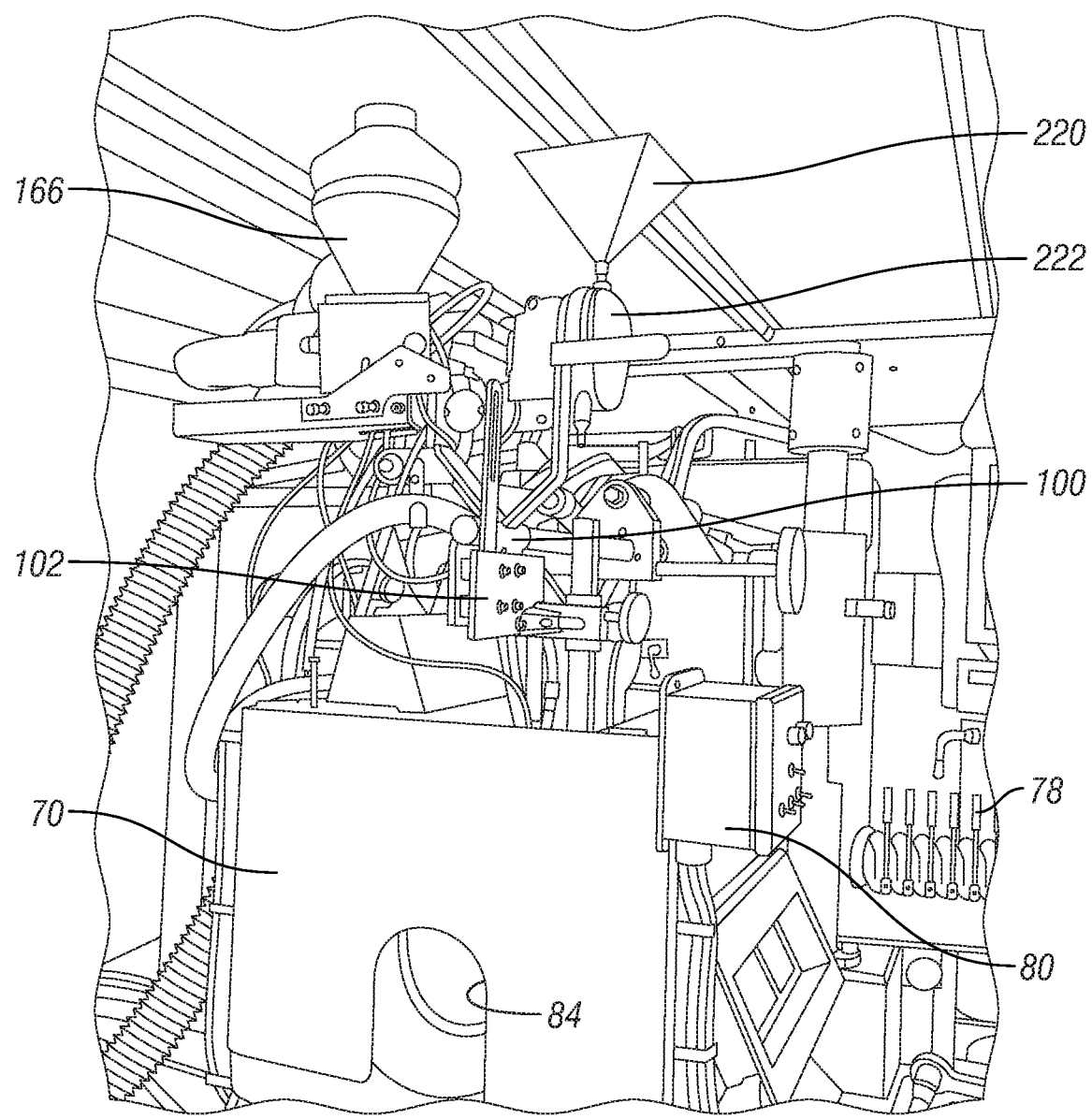
FIG. 6 is an enlarged view of the welding compartment in the rear of the unit.

With reference now also to FIG. 6, the layout of the welding compartment 54 is illustrated. Positioned centrally in the compartment 54 is a weld box 70. A seat 72 (FIG. 5) for the operator may be mounted to one side of the weld box 70, where the several control panels are located. The main electrical control panel 76 and the hydraulic panel 78 (FIG. 6) thus are located to the operator's right as he faces the weld box 70. The remote box 80 is mounted directly to the side of the weld box 70 adjacent the operator's view window (not shown) for constant monitoring and control of the welding process. Of course, an opening 84 is provided in the front of the weld box for inserting the drill string section. This rear pipe entry configuration is particularly preferred, but the compartment may be configured for side loading as well.

As previously indicated, the unit 10 is designed to be parked temporarily at the well site near a pipe rack containing the drill string sections to be hardbanded. The components to lift, move and rotate the drill pipe sections, referred to herein generally as a pipe management assembly 90 are conventional and, thus, are illustrated only schematically in FIG. 7, to which attention now is directed. The unit 10 preferably is equipped with a pair of hydraulic pipe jacks 92 which can be stationed adjacent the pipe rack. The height of the pipe jacks may be hydraulically adjustable to match the height of the adjacent pipe rack. The pipe cradles on the jacks include ball transfer rollers for facilitating the movement of the pipe section into and out of the weld box 70. There may be a third pipe jack 94 behind the chuck for supporting the end of heavy weight drill pipe. One or more additional jacks with motorized rollers (not shown) may be included to assist the operator with loading and unloading heavier sections, such as drill collars. A hydraulic chuck assembly 96 is mounted in the welding compartment 54 for gripping and rotating the section. A hydraulic chuck stand 96a and 96b may be used to position the weld box 70 vertically and axially (extend and retract) relative to the pipe section.

The unit 10 may be provided with a propane-fueled pre heater (not shown) for heating the pipe joint in advance of the hardbanding procedure. Additionally, several cooling cans (not shown) may be supplied on the unit 10 to modulate the cooling of the pipe joints after completion of the hardbanding process. The unit 10 may house a diesel fuel tank, a hydraulic tank, heaters for the hydraulic tank, and other equipment typically utilized during a conventional hardbanding operation. As these components are well known to those familiar with the hardbanding process, they are not shown or described in detail.

Referring again to FIG. 6, a torch management assembly 100 is supported above the weld box 70. This assembly 100 allows the welding torch to be positioned precisely, and it also provides for automated oscillation for creating a specific band width on the tool joint. As this technology is conventional, it will not be described or shown in detail.

Figure 8:
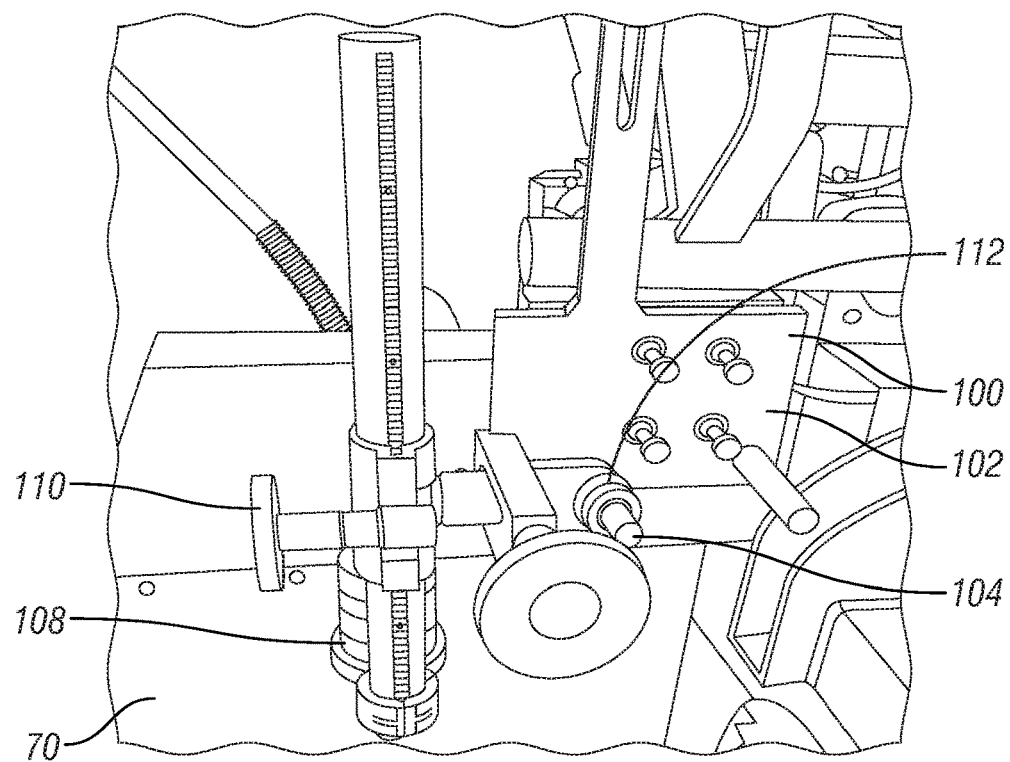
FIG. 8 is an enlarged view from the right side of the unit of the adjustable bracket for supporting the welding torches. A PTA torch is supported on the bracket.
Figure 9:
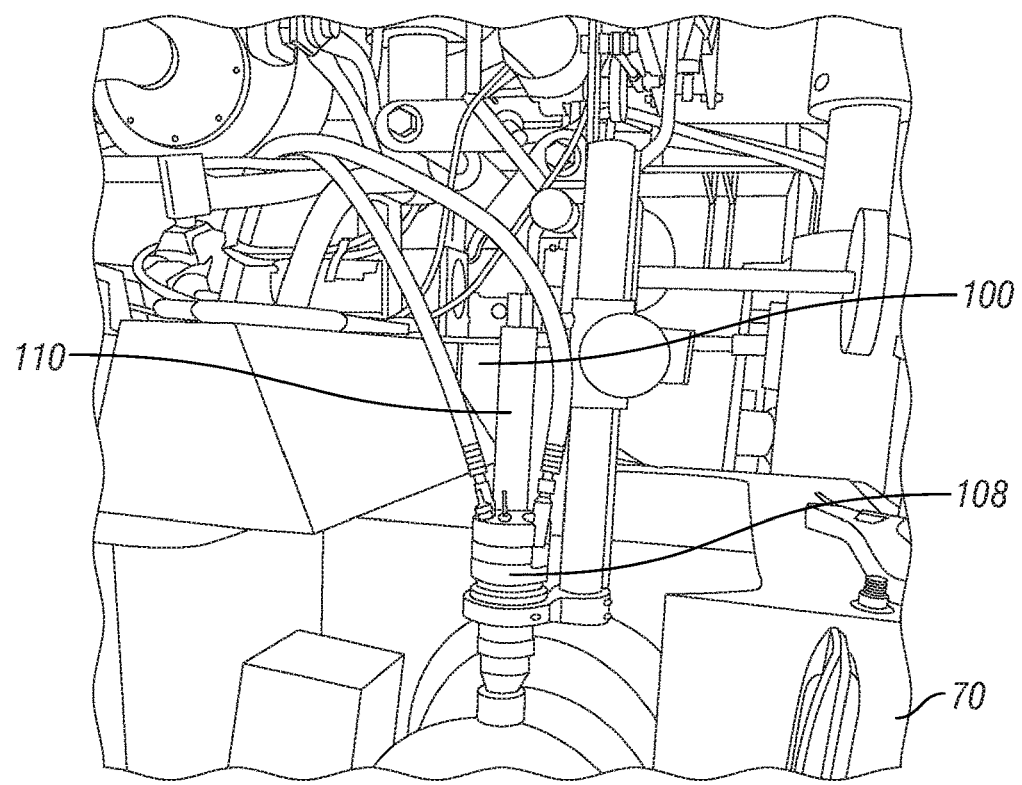
FIG. 9 is an enlarged view from the rear of the unit showing the adjustable bracket supporting the PTA torch.

With reference now to FIGS. 8-17, in accordance with the present invention, the torch mounting management assembly 100 comprises a torch mounting plate 102 supported over the weld box 70. A torch mounting stub 104 extends from the plate 102. The PTA torch 108 comprises a torch holder 110 that includes a stub sleeve 112 (FIG. 17) that slidably receives the mounting stub 104 (FIG. 8). In this way, the PTA torch 108 is removably secured to the torch management assembly 100.

Figure 10:
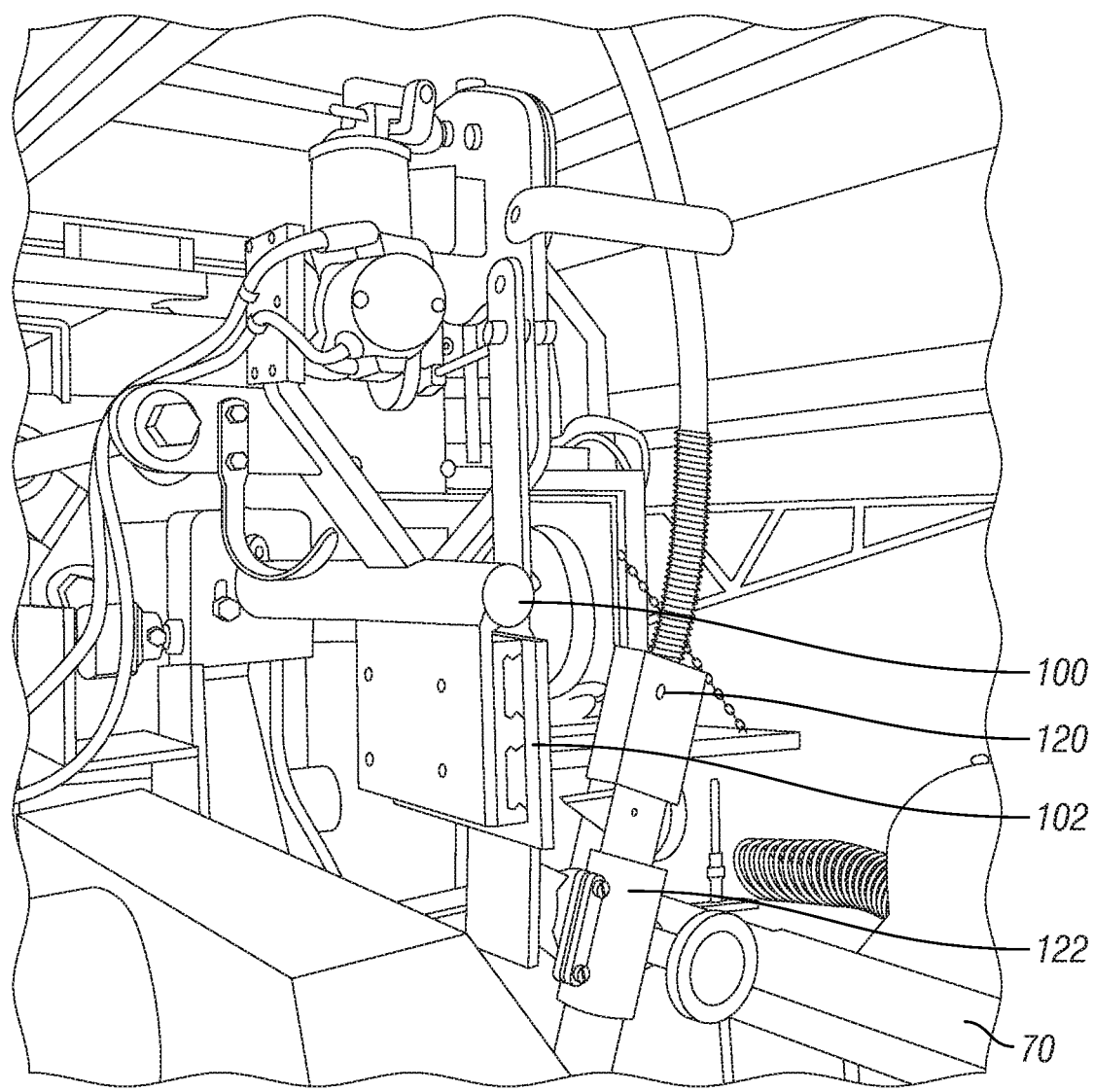
FIG. 10 is an enlarged view from the rear of the unit showing the adjustable bracket supporting a MIG torch.
Figure 11:
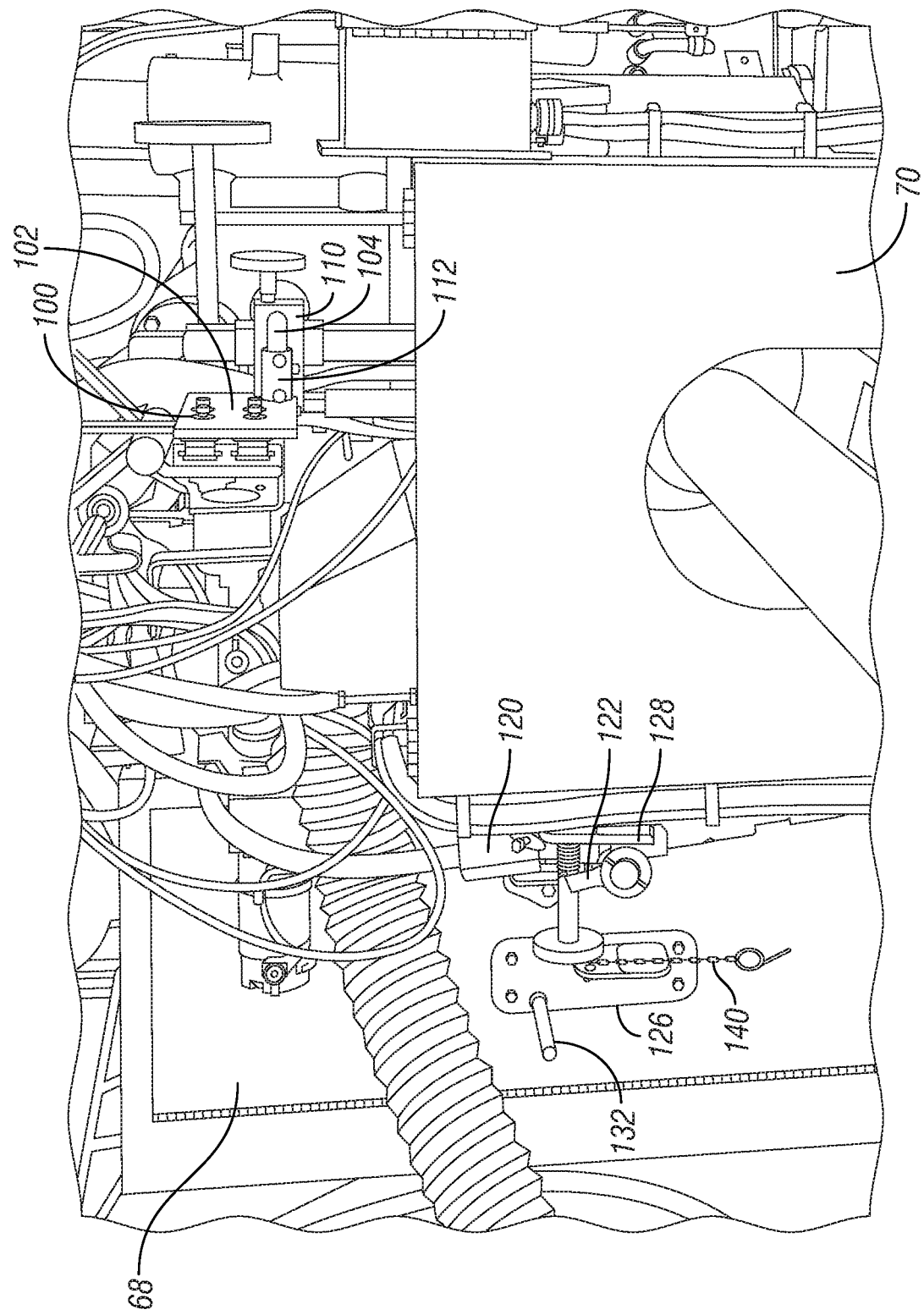
FIG. 11 is a view from the rear of the unit showing the PTA torch working and the MIG torch parked on the side of the weld box.

In addition to the PTA torch 108, the unit also may include a non-PTA torch, such as a MIG torch 120 (FIGS. 10 & 11). The MIG torch 120 may also be provided with a torch holder 122 that includes a stub sleeve 124 similar to the stub sleeve 112 on the PTA torch holder 110. Thus, the PTA torch 108 and the MIG torch 120 are supportable alternately in the weld box 70.

The hardbanding unit 10 may be equipped with a torch mount for each of the PTA torch 108 and the MIG torch 120 when they are not in use. As shown in FIGS. 12-17, these torch mounts, designated respectively at 126 and 128, are conveniently located in the welding compartment 54 on the side of the welding box 70 opposite of the operator station. The PTA torch mount 126 may be mounted to the side of the storage cabinet 68 (FIGS. 16 & 17), and the MIG torch mount 128 (FIGS. 11-13) may be fixed to the side of the weld housing or weld box 70.

Figure 12:
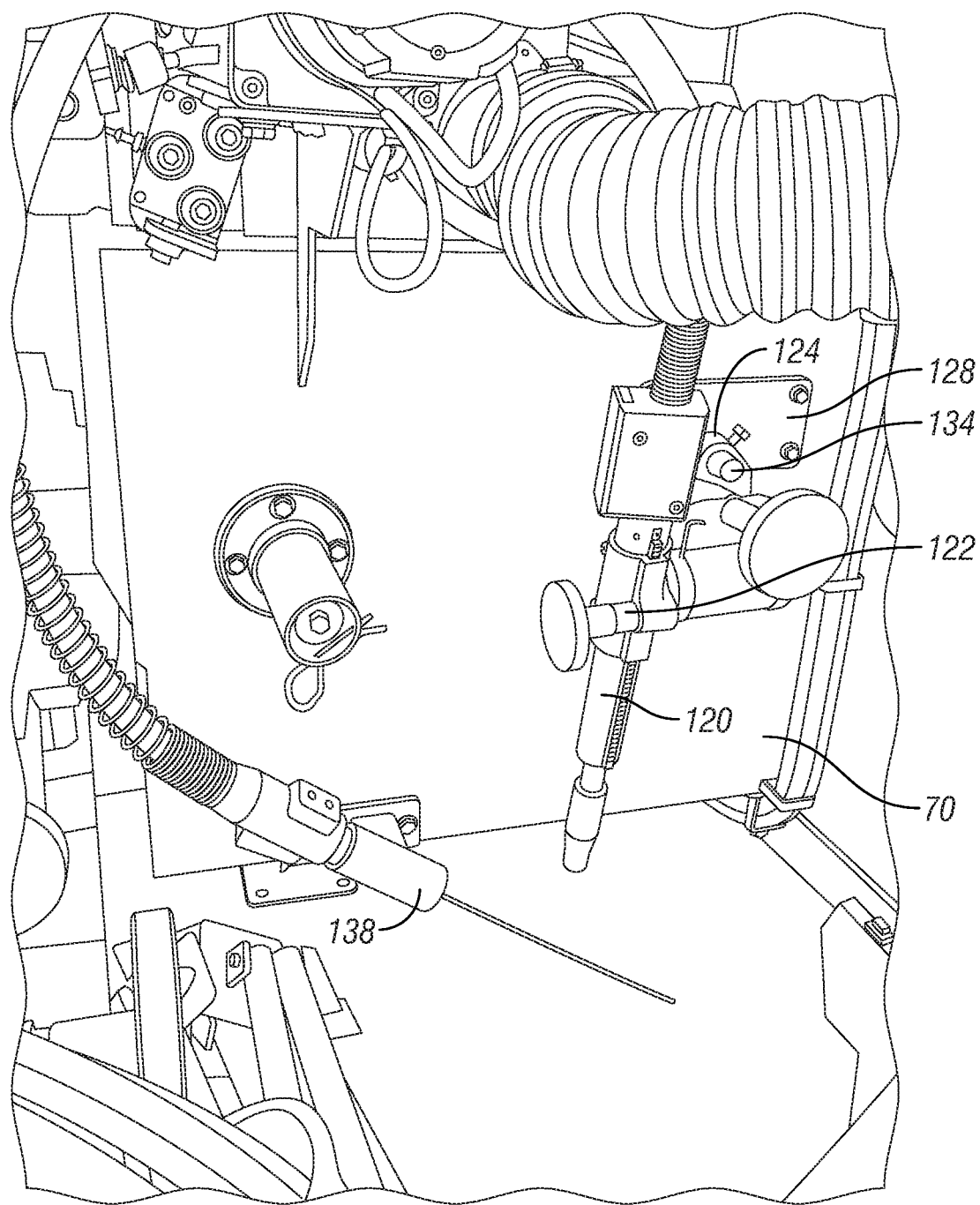
FIG. 12 is a view from the left side of the unit showing the MIG torch in the parked position.
Figure 13:
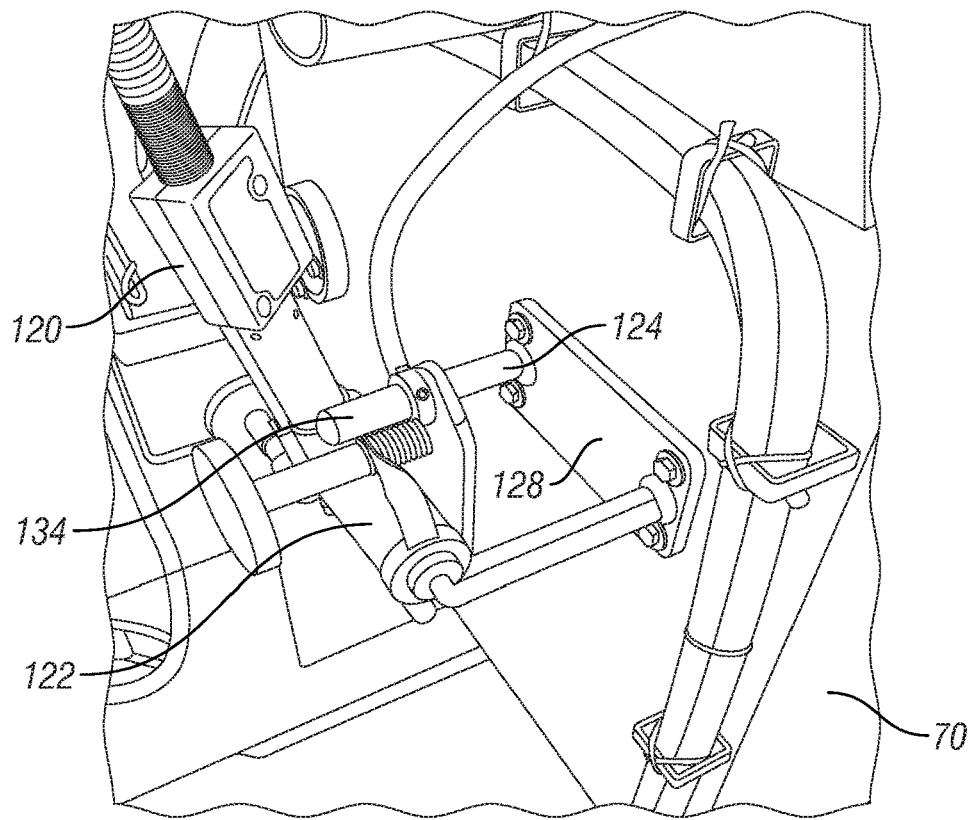
FIG. 13 is an enlarged view from above the weld box showing the MIG torch parked.
Figure 15:
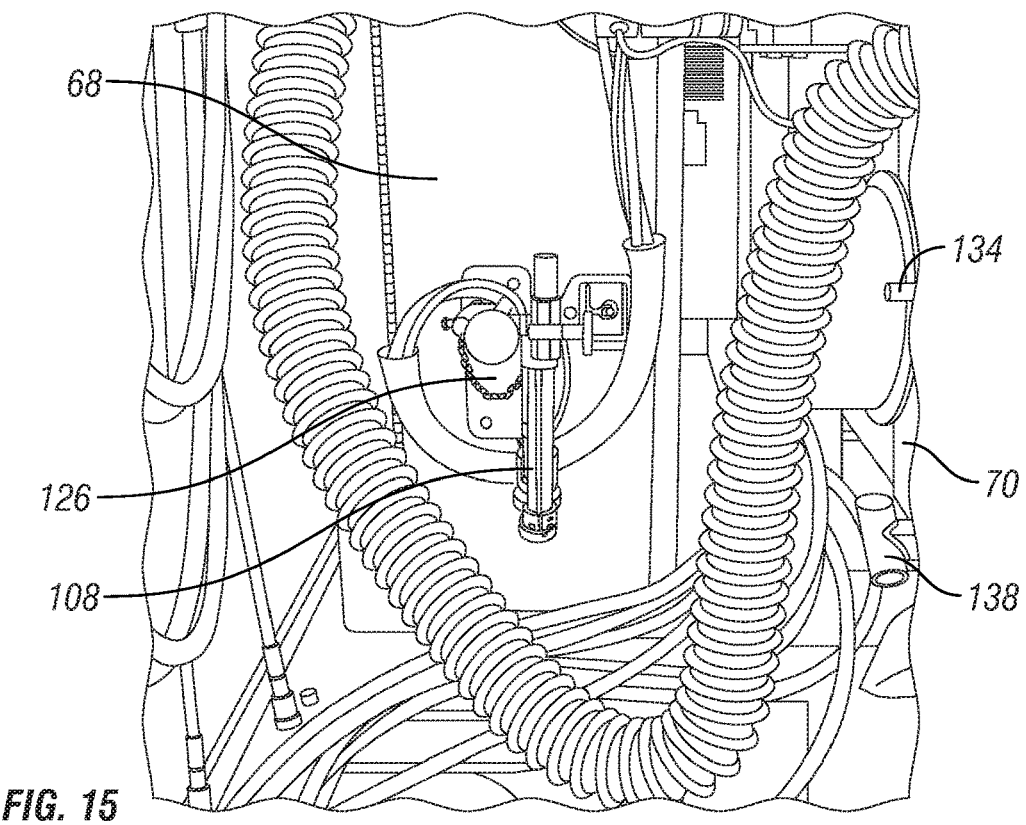
FIG. 15 is an enlarged view of the parked PTA torch. The parking stub and the nozzle holster for the MIG torch are also shown.
Figure 16:
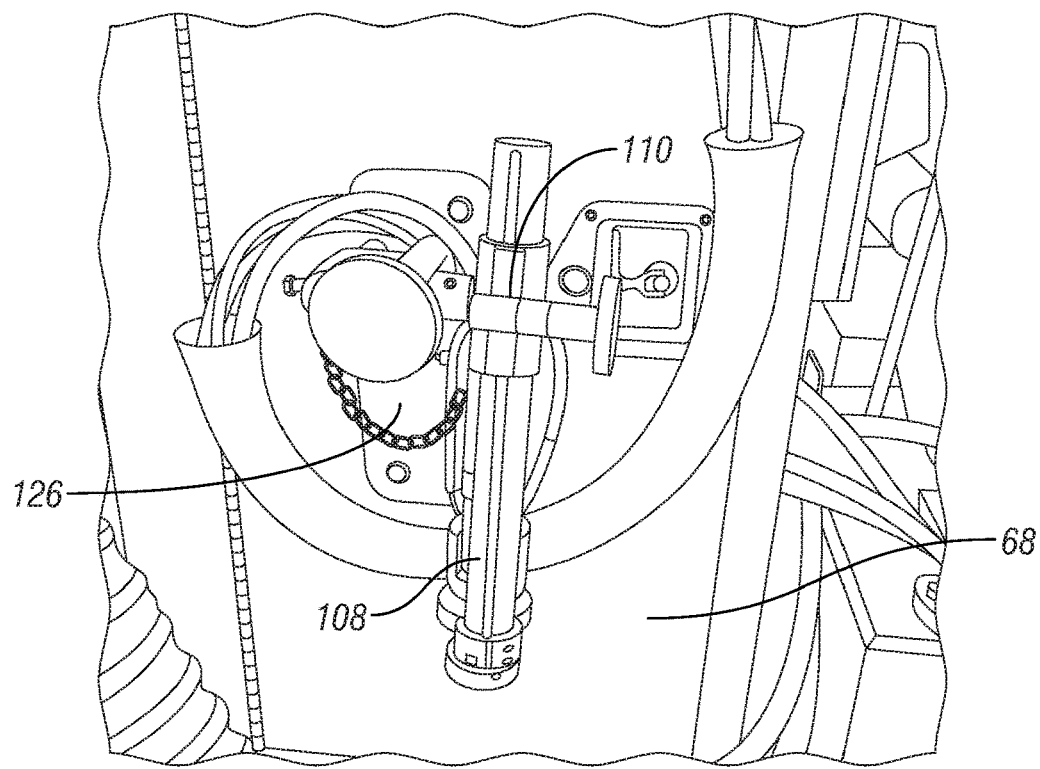
FIG. 16 is an enlarged view of the parked PTA torch viewed from the back of the trailer.
Figure 17:
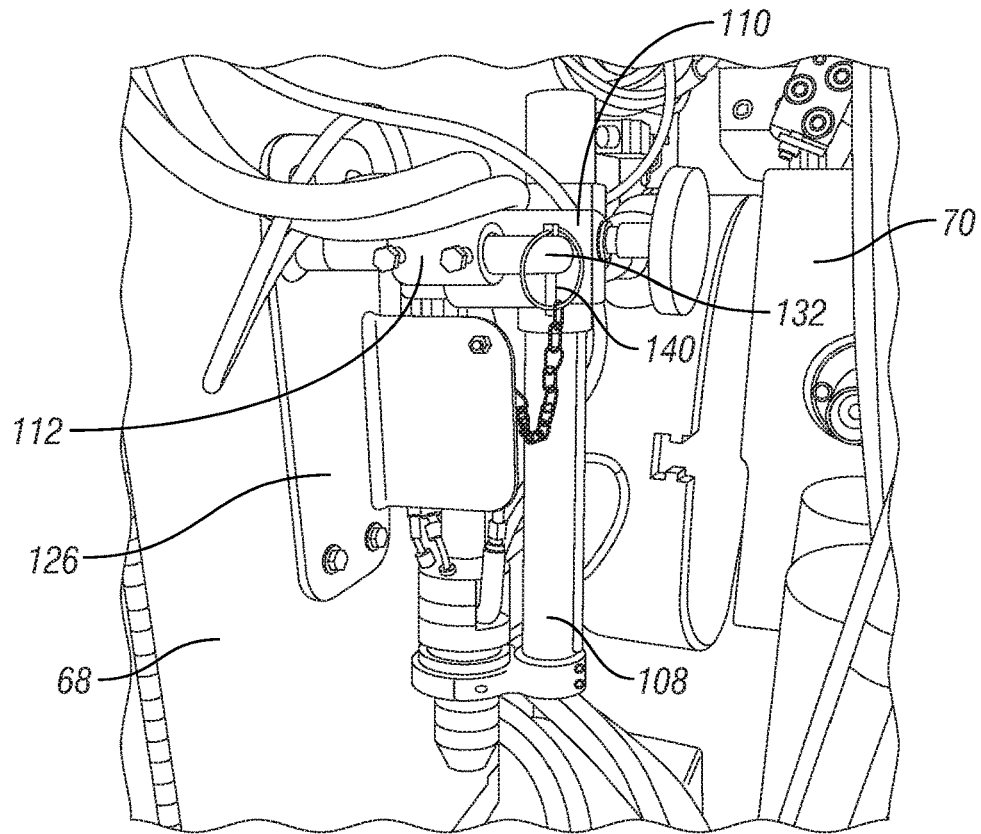
FIG. 17 is an enlarged view of the parked PTA torch viewed from the left side of the trailer.

Each of the torch mounts 126 and 128 has a torch parking stub 132 and 134, respectively. The torch parking stubs 132 and 134 may be similar to the torch mounting stub 104 on the torch mounting plate 102. In this way, the stud sleeves 112 and 124 on the torch holders 110 and 122 will also fit the torch parking stubs 132 and 134. As best seen in FIGS. 12 and 15, the MIG torch mount 128 may include a socket or holster 138 for securing the disconnected free end of the cable from the parked MIG torch 120. The PTA torch mount 126 may also include a locking pin assembly 140 (FIGS. 11, 16, & 17) to ensure that the parked PTA torch remains secure during travel and storage of the unit 10.

Figure 18:
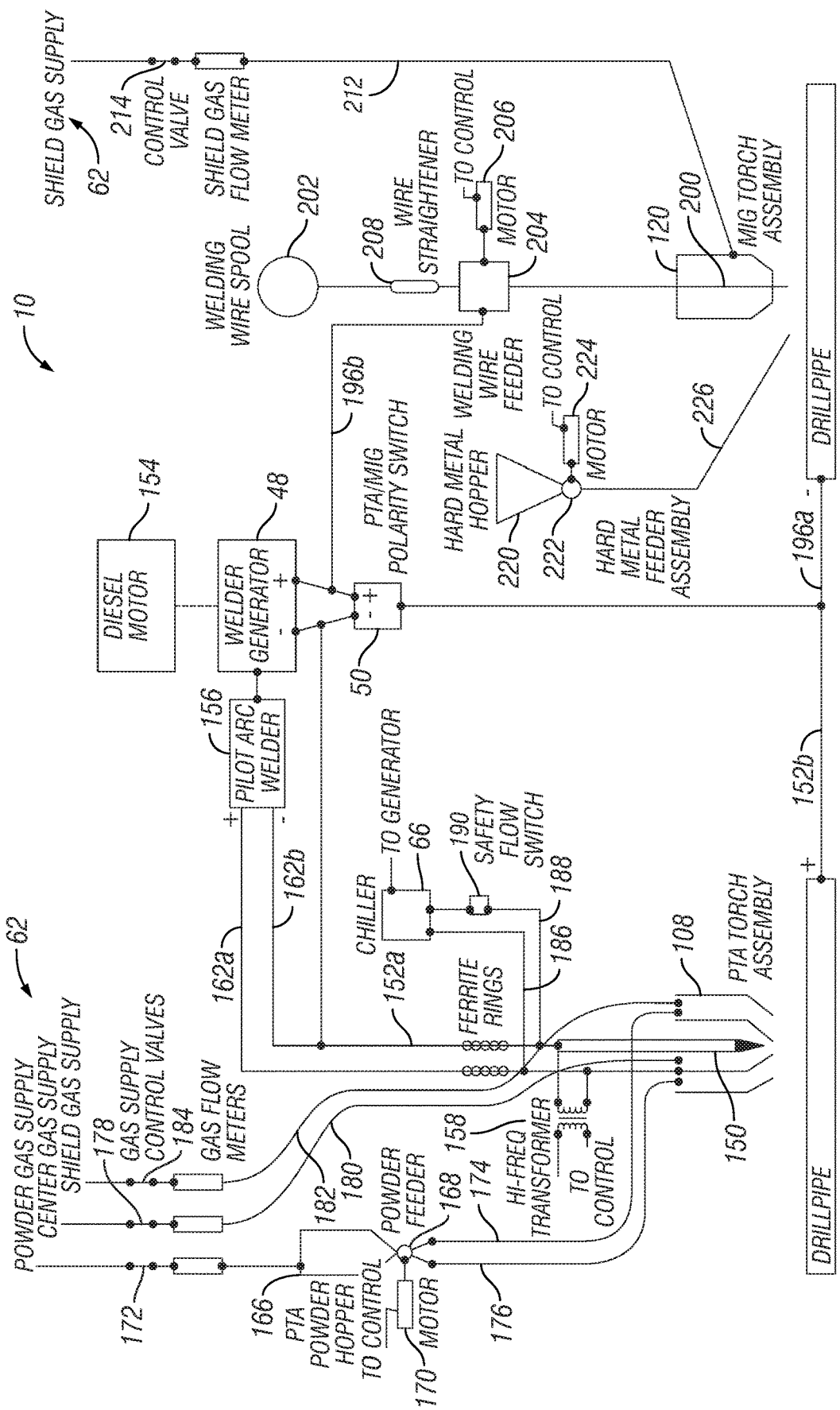
FIG. 18 is an operational schematic of the welding system.

Having described the various components of the unit 10, the operation of the unit will be summarized with reference to the schematic in FIG. 18. The PTA assembly is shown on the left side of the drawing and the MIG assembly is on the right. Power to the electrode 150 of the PTA torch 108 for the main plasma arc is supplied by the primary welder generator 48 by the electrical conduit 152a and 152b. A power source with a strong engine is necessary as relatively small variations in amperage can break the transferred arc. The power source must be able to maintain constant current and voltage without deviation in order to maintain a table transferred arc during the welding process. A preferred welding machine for this purpose is a 500 amp engine-driven welder with a turbo-charged Perkins brand engine, such as the Vantage 500 brand machine from Lincoln Electric (Cleveland, OH), which is powered by the diesel motor 154.

For the pilot arc, a secondary, smaller welder 156 is used with a high frequency transformer 158. These may be located in a smaller storage cabinet 160 (FIG. 5) in the welding compartment 54. A preferred unit for the secondary power source is the Invertec V160-T TIG brand welder also by Lincoln Electric. Electrical conduits 162a and 162b connect the secondary welder 156 to the PTA torch 108.

The PTA powder is contained in a hopper 166 (see also FIGS. 6 and 20) and is metered by a powder feeder 168 driven by the motor 170. The carrier or powder gas preferably is one hundred percent (100%) helium supplied by a tank 62 (FIG. 4). The gas-entrained PTA powder is supplied to the PTA torch 108 by the conduits 174 and 176. A valve 172 controls the powder gas flow. The center or plasma gas, which is preferably one hundred percent (100%) argon gas, is supplied to the PTA torch 108 by the conduit 180. A valve 178 controls the center gas flow. The shield gas, which also is preferably one hundred percent (100%) argon gas, is supplied to the PTA torch 108 by the conduit 182. A valve 184 controls the shield gas flow. The center gas and shield gas are all supplied from tanks 62.

The chiller 66 (FIG. 4) circulates chilled water to the PTA torch 108 and power cables through the conduits 186 and 188. A safety flow switch 190 should be included to immediately shut down the operation in the event the flow of the water drops below a predetermined level. As indicated in the schematic of FIG. 18, the chiller 66 may be used to cool the welding conduits as well as the PTA torch head. Additionally, it should be noted that the chiller is a refrigerant-to-water heat exchanger rather than an air cooled system.

The primary welder 48 also supplies power to the MIG torch 120 by the electrical conduits 196a and 196b. The polarity switch 50 is interposed in the electrical conduits 152a and 152b of the PTA torch assembly and the conduits 196a and 196b of the MIG torch assembly.

The consumable wire electrode 200 in the MIG torch 120 may be a wire fed from a spool 202 by wire feeder 204 driven by an electric motor 206. A wire straightener 208 may be included.

The shield gas for the MIG torch 120, which also is preferably ninety-eight percent (98%) argon and two percent (2%) oxygen, is supplied to the MIG torch 120 by the conduit 212. A valve 214 controls the shield gas flow. The shield gas is also supplied from tanks 62.

Occasionally, particulate or pulverized hard metal, such as tungsten carbide powder, will be introduced to the weld pool when using the MIG welding process. To that end, the unit 10 includes a hopper 220 with a feeder 222 driven by the motor 224. The particulate is supplied to the tip of the MIG torch 120 by the conduit 226. The trickle wheel meters and agitates the tungsten carbide particulate.

Figure 7:
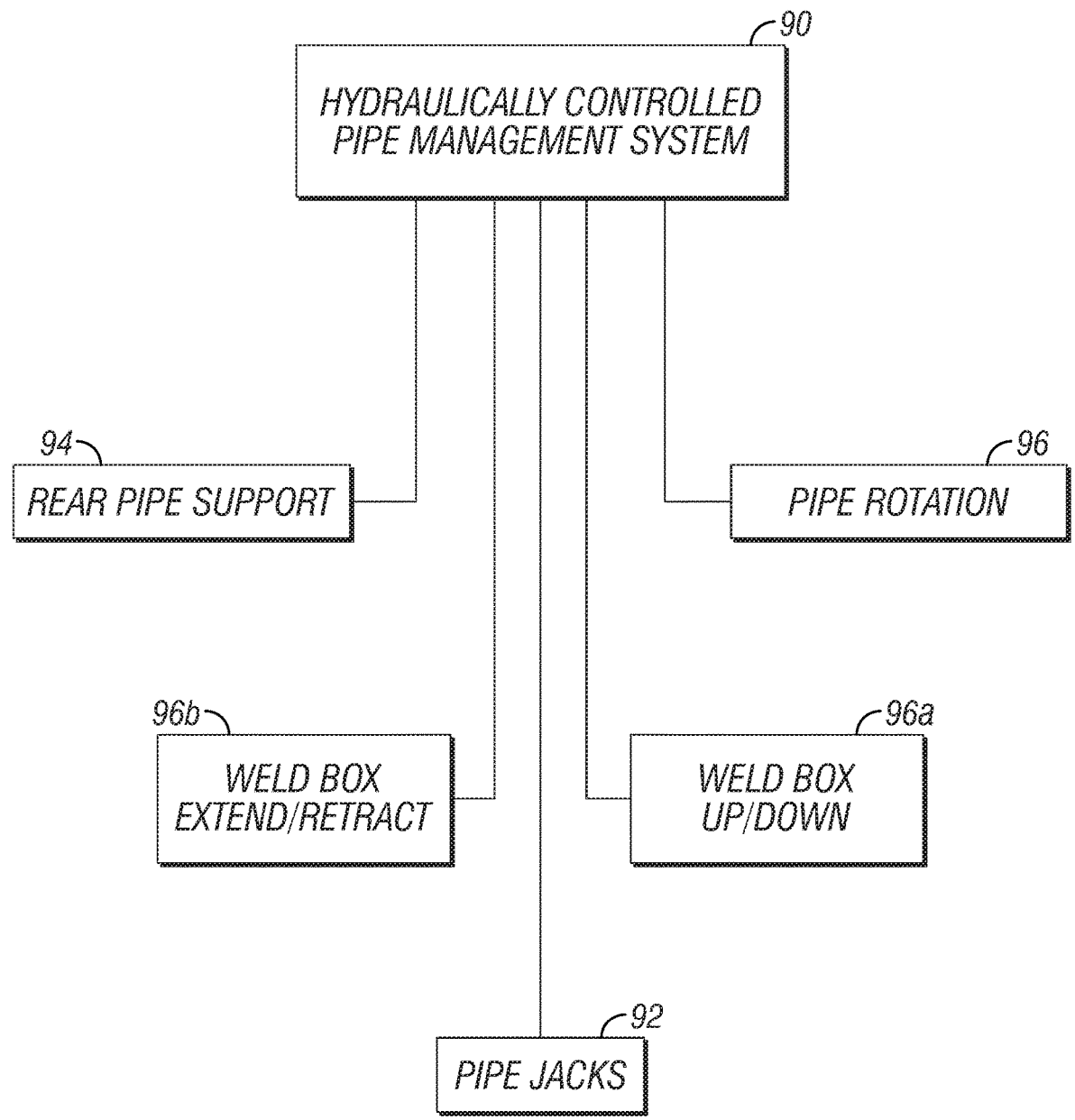
FIG. 7 is a schematic illustrating the hydraulically controlled pipe management assembly of the unit.
Figure 19:
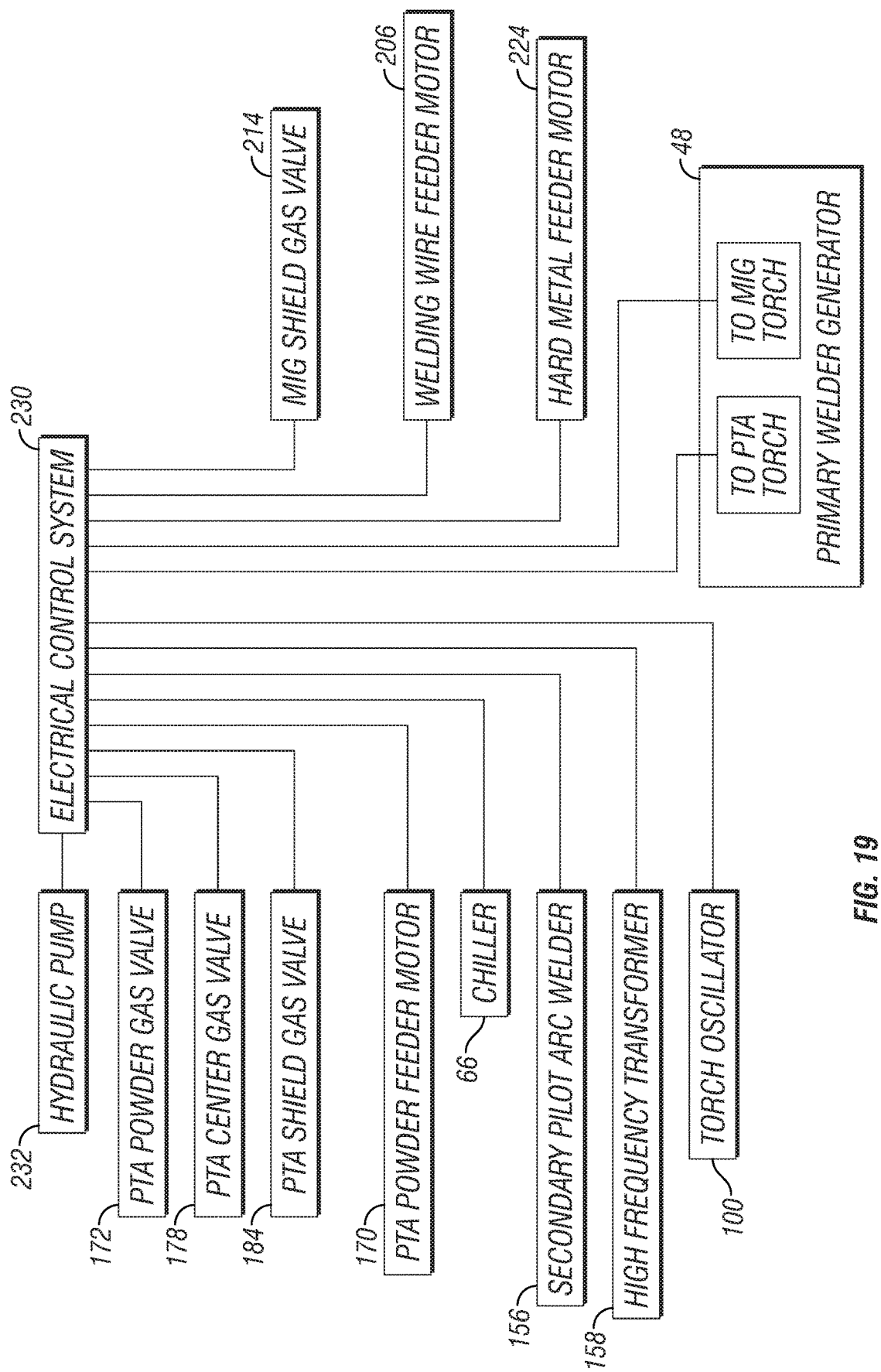
FIG. 19 is a schematic illustrating the electrically controlled components of the unit.

The unit 10 also includes an electrical control system 230 which is located in the operator's station in the welding compartment 54. As previously described and as illustrated in the schematic in FIG. 19, the electrical control system 230 is operatively connected to the gas valves 172, 178, 184, and 214 and to the motors 170, 206 and 224. The system 230 also controls secondary pilot arc welder 156 and the transformer 158, as well as the chiller 66. The torch oscillator, which is part of the torch management assembly 100, is also controlled by the system 230. Finally, the control system 230 operates the primary welder 48 and the hydraulic pump for the hydraulic system 90 (FIG. 7).

Now it will be appreciated that the mobile hardbanding unit 10 of the present invention brings the advantages of the PTA welding process to the well site. Moreover, the unit 10 offers the versatility of being used for MIG welding in addition to PTA welding. Converting from one system to the other is simplified because each torch is provided with its own dedicated set of conduits (powder, gas, electrical). The torch not in use is simply dismounted from the torch management assembly and parked a few feet away in a designated location. As indicated previously, reversal of current through the welding assembly when switching between MIG and PTA welding is easily accomplished by a conveniently located polarity switch 50.

Figure 20:
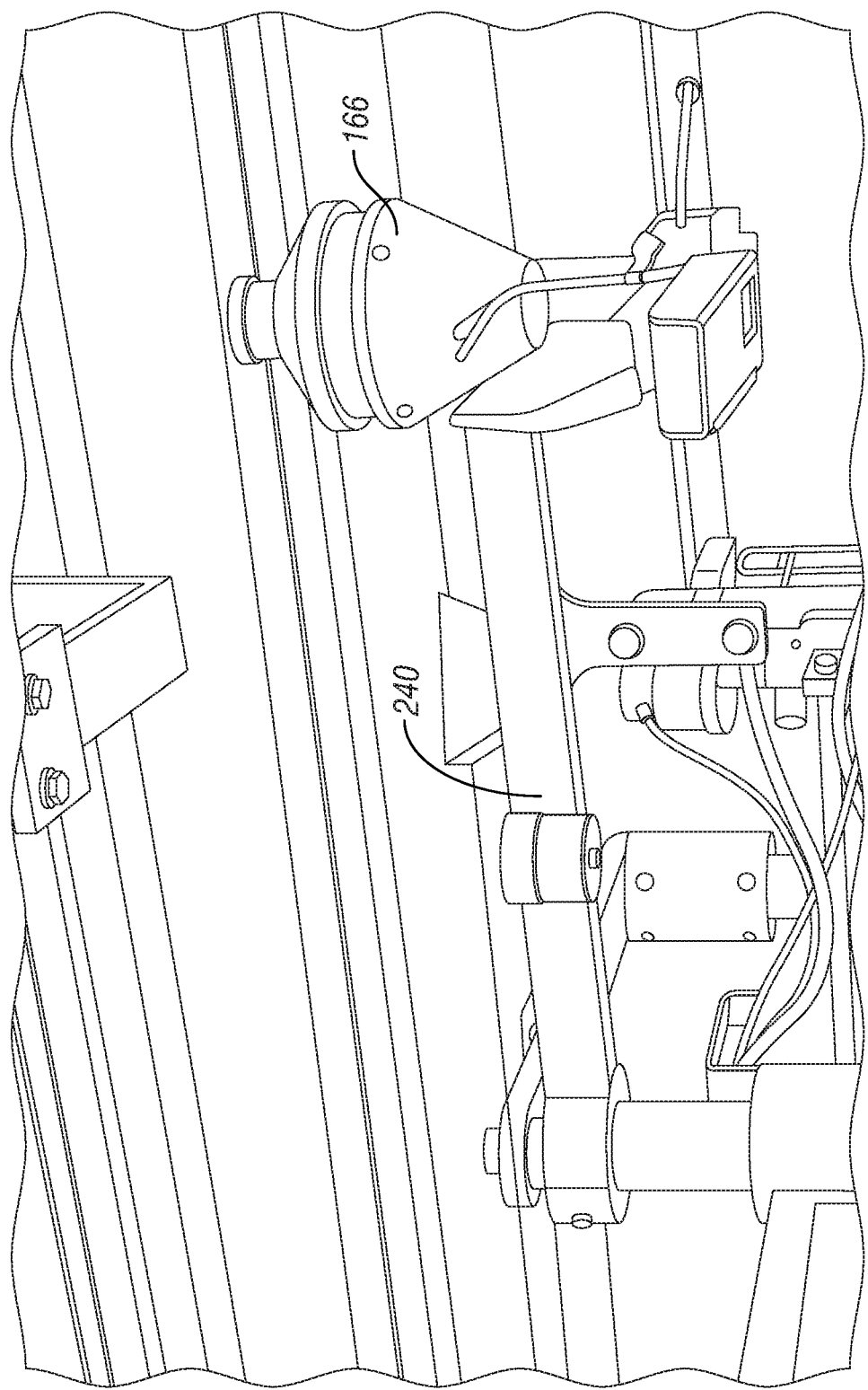
FIG. 20 is a view from the right side of the unit into the weld compartment showing the swivel arm that supports the powder hopper for the PTA torch assembly.

Several other adaptations may make the switch between welding systems even smoother. For example, the PTA powder hopper 166 may be mounted on a swivel arm 240, as seen in FIG. 20, for supporting it between a PTA position and a MIG position, wherein in the PTA position the hopper is supported near the weld box 70, and wherein the MIG position the hopper is parked a distance away from the weld box.

In accordance with the method of the present invention, a mobile hardbanding unit is provided at a first well site. The unit comprises a PTA welding assembly. Sections of the drill string are sequentially treated in the unit to add, replace, or refurbish hardbands at the tool joints. The drill string sections may be regular drill pipe, heavy-weight drill pipe, drill collars or other tubular members in the drill string. In a preferred embodiment, the method comprises converting the welding assembly in the unit to a non-PTA welding system and providing the unit to a second well site. Sections of drill string are sequentially treated at the second well site to add, replace, or refurbish hardbands at the tool joints using the non-PTA welding assembly.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the invention to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. A mobile hardbanding unit for applying a wear-resistant metal band to a drill string section, the unit comprising:
   a mobile platform;
   a weld box supported on the platform comprising an opening for receiving a drill string section;
   a PTA torch supportable in the weld box;
   an electrical power source electrically connected to the PTA torch;
   electrical conduits connecting the power source to the PTA torch;
   a PTA powder feed assembly comprising:
      a PTA powder container connectable to a supply of PTA powder gas;
      a PTA conduit for conducting gas-entrained PTA powder to the PTA torch; and
      an adjustable feeder for metering the supply of gas-entrained PTA powder to the PTA conduit;
   a conduit configured to connect a center gas supply to the PTA torch;
   a conduit configured to connect a shield gas supply to the PTA torch;
   a cooling system comprising:
      a chiller; and
      a conduit for circulating a chilled fluid between the chiller and the PTA torch and the electrical conduits connecting the power source to the PTA torch;
   a pipe management assembly;
   a control system;
   a non-PTA arc welding torch supportable in the weld box;
   electrical conduits connecting the electrical power source to the non-PTA torch;
   a hard metal feed assembly comprising an adjustable feeder for metering the supply of hard metal to the non-PTA torch;
   a conduit configured to connect a shield gas supply to the non-PTA torch; and
   a polarity switch interposed in the electrical conduits connecting the electrical power source to the non-PTA torch and the electrical conduits connecting the electrical power source to the PTA torch.

2. The mobile hardbanding unit of claim 1 wherein the electrical power source comprises a primary diesel powered welding generator capable of powering the plasma arcs produced by the PTA torch.

3. The mobile hardbanding unit of claim 2 wherein the electrical power source further comprises a secondary electrically powered generator capable of powering the pilot arc produced by the PTA torch and a high frequency transformer.

4. The mobile hardbanding unit of claim 1 further comprising:
   a non-PTA torch mount for parking the non-PTA torch on the platform a distance from the weld box when the PTA torch is in use; and
   a PTA torch mount for parking the PTA torch on the platform a distance from the weld box when the non-PTA torch is in use.

5. The mobile hardbanding unit of claim 4 wherein the PTA powder feed assembly comprises a swivel arm support for supporting the PTA powder container for movement between a PTA position and a non-PTA position, wherein in the PTA position the PTA powder container is supported near the weld box, and wherein the non-PTA position the PTA powder container is supported a distance away from the weld box.

6. The mobile hardbanding unit of claim 1 wherein each of the non-PTA torch and the PTA torch mounts comprises a torch mounting plate and a torch mounting stub extending from the torch mounting plate, wherein each of the non-PTA torch and the PTA torch comprises a torch holder with a stub sleeve that slidably receives the torch mounting stub.

7. A mobile hardbanding unit for applying a wear-resistant metal band to a drill string section, the unit comprising:
   a mobile platform;
   a weld box supported on the platform comprising an opening for receiving a drill string section;
   a PTA torch supportable in the weld box;
   an electrical power source electrically connected to the PTA torch;
   electrical conduits connecting the power source to the PTA torch;
   a PTA powder feed assembly comprising:
      a PTA powder container connectable to a supply of PTA powder gas;
      a PTA conduit for conducting gas-entrained PTA powder to the PTA torch; and
      an adjustable feeder for metering the supply of gas-entrained PTA powder to the PTA conduit;
   a conduit configured to connect a center gas supply to the PTA torch;

a conduit configured to connect a shield gas supply to the PTA torch;
a cooling system comprising:
  a chiller; and
  a conduit for circulating a chilled fluid between the chiller and the PTA torch and the electrical conduits connecting the power source to the PTA torch;
a pipe management assembly;
a MIG torch supportable in the weld box;
electrical conduits connecting the electrical power source to the MIG torch;
a welding wire feeder for feeding a consumable welding wire to the MIG torch;
a hard metal feed assembly comprising:
  a container for holding a supply of hard metal particulate;
  a conduit for conducting the hard metal particulate to the MIG torch; and
  an adjustable feeder for metering the supply of hard metal particulate to the MIG torch;
a conduit configured to connect a shield gas supply to the MIG torch; and
a polarity switch interposed in the electrical conduits connecting the electrical power source to the MIG torch and the electrical conduits connecting the electrical power source to the PTA torch.

8. The mobile hardbanding unit of claim 7 further comprising:
a MIG torch mount for parking the MIG torch on the platform a distance from the weld box when the PTA torch is in use; and
a PTA torch mount for parking the PTA torch on the platform a distance from the weld box when the MIG torch is in use.

9. The mobile hardbanding unit of claim 8 wherein the PTA powder feed assembly comprises a swivel arm support for supporting the PTA powder container for movement between a PTA position and a MIG position, wherein in the PTA position the PTA powder container is supported near the weld box, and wherein in the MIG position the PTA powder container is supported a distance away from the weld box.

10. The mobile hardbanding unit of claim 8 wherein each of the MIG torch and the PTA torch mounts comprises a torch mounting plate and a torch mounting stub extending from the torch mounting plate, wherein each of the MIG torch and the PTA torch comprises a torch holder with a stub sleeve that slidably receives the torch mounting stub.

* * * * *